(12) United States Patent
     Sly

(10) Patent No.: US 8,950,428 B2
(45) Date of Patent:       Feb. 10, 2015

(54) AUTOMATIC RAIN BARREL

(76) Inventor: George Sly, Seattle, WA (US)

( * ) Notice: Subject to any disclaimer, the term of this patent is extended or adjusted under 35 U.S.C. 154(b) by 736 days.

(21) Appl. No.: 13/188,229

(22) Filed: Jul. 21, 2011

(65) Prior Publication Data

US 2011/0277852 A1    Nov. 17, 2011

Related U.S. Application Data

(60) Provisional application No. 61/381,220, filed on Sep. 9, 2010.

(51) Int. Cl.
    *F16K 21/18*  (2006.01)
    *E03B 1/04*   (2006.01)
(52) U.S. Cl.
    CPC ........... *E03B 1/041* (2013.01); *E03B 2001/047* (2013.01)
    USPC ........... 137/389; 137/114; 137/357; 137/408; 137/613; 137/624.11

(58) Field of Classification Search
    CPC .................................................. E03B 2001/047
    USPC ............. 137/111, 112, 113, 114, 236.1, 343, 137/357, 389, 101.25, 101.27, 101.29, 403, 137/408, 613, 624.11, 624.12, 624.21; 405/36, 37, 39
    See application file for complete search history.

(56) References Cited

U.S. PATENT DOCUMENTS

| | | | | |
|---|---|---|---|---|
| 4,119,116 A * | 10/1978 | Johnson et al. | ............... | 137/387 |
| 5,192,426 A * | 3/1993 | DeCoster et al. | ............. | 210/117 |
| 5,396,745 A * | 3/1995 | Klein | ........................... | 52/169.6 |
| 5,498,330 A * | 3/1996 | Delle Cave | .................... | 210/103 |
| 6,132,138 A * | 10/2000 | Haese | .............................. | 405/37 |
| 6,355,160 B1 * | 3/2002 | Wiseman et al. | ............... | 210/90 |
| 6,507,775 B1 * | 1/2003 | Simon et al. | .................. | 700/284 |
| 6,887,375 B2 * | 5/2005 | Johnson | ................... | 210/170.03 |
| 7,066,197 B1 * | 6/2006 | Gray et al. | ..................... | 137/357 |
| 7,207,748 B1 * | 4/2007 | Urban | .............................. | 405/51 |
| 2004/0040598 A1 * | 3/2004 | Zimmerman et al. | ........ | 137/357 |
| 2008/0128025 A1 * | 6/2008 | Brown et al. | ..................... | 137/9 |
| 2008/0149188 A1 * | 6/2008 | Zimmerman et al. | ..... | 137/236.1 |

* cited by examiner

*Primary Examiner* — Kevin Murphy
(74) *Attorney, Agent, or Firm* — Seattle Patent Group LLC; James Haugen

(57) ABSTRACT

An automatic rain barrel is disclosed, providing the ability to easily use a mix of rainwater and water from another source for tasks such as watering landscaping.

9 Claims, 2 Drawing Sheets

AUTOMATIC RAIN BARREL

CROSS-REFERENCE TO RELATED APPLICATIONS

This application claims priority to provisional application No. 61/381,220 for an Automatic Rainbarrel by George Sly, filed on Sep. 9, 2010.

FIELD

This disclosure relates to water conservation using hybrid rain barrels.

BACKGROUND

Rain barrels are often used to collect rainwater for later use to irrigate landscapes or crops. They often will collect rainwater that has fallen on a roof or on a large hard ground surface, such as a paved parking lot or driveway. Many homeowners like the idea of conserving fresh water, and using rainwater for irrigation places less demand on wells or water supplies during drier periods.

Rain barrels may be integrated with sprinkler systems but during dry weather, a rain barrel may not have water to provide a sufficient amount for the plants being maintained. In that situation, a homeowner unsure of the quantity of water available may use a different source, such as a well or water supply, to ensure an adequate supply is available, leaving water in the rain barrel unused.

SUMMARY OF THE INVENTION

The instant application discloses, among other things, an automatically filling rain barrel. If the barrel has insufficient water to complete a watering task, water from a well, municipal water supply, or other source may be used to fill the rain barrel sufficiently to complete the watering, which may maximize the use of the available rainwater.

The automatically filled rain barrel may have one or more tanks of sufficient size to hold water for a watering task connected to one or more sources of rainwater. A low voltage valve may be used to control addition of water from a pressurized source, such as a municipal water supply. A valve, such as a float valve, may be used to control water level in the tank. The pressurized source may be used to augment collected rainwater to provide sufficient water to complete the watering task.

The automatically filled rain barrel may also have a pump to pump water from the rain barrel to a system using the water.

DESCRIPTION OF THE INVENTION

Figure 1:
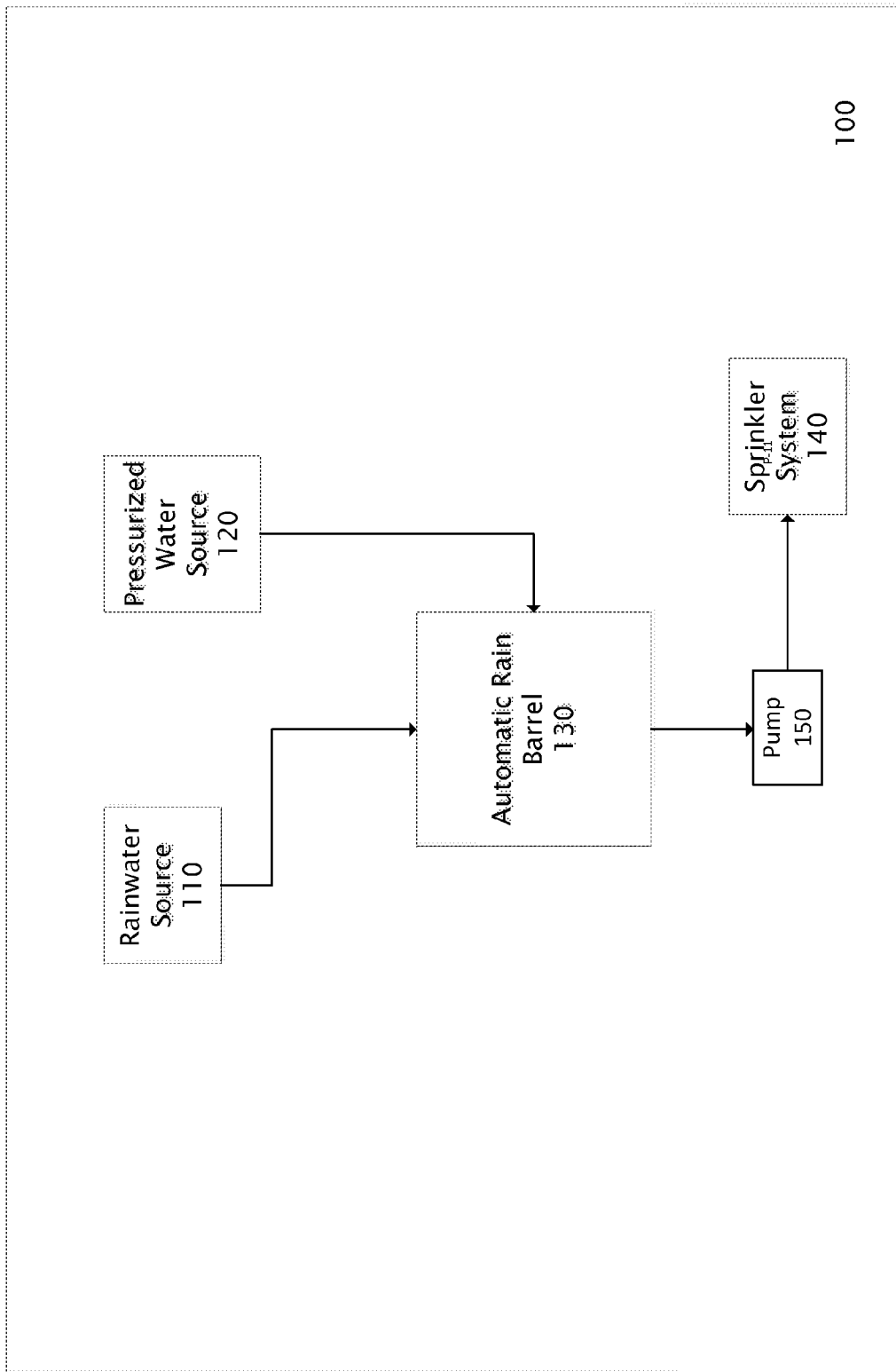
FIG. 1 is an example of a system in which an automatic rain barrel may be used.

FIG. 1 is an example of a system 100 in which an automatic rain barrel 130 may be used. Rainwater source 110 may be a roof or hard ground surface used to direct rainwater to automatic rain barrel 130. Pressurized water source 120 may be used to supplement any collected rain by filling automatic rain barrel 130 to a desired level. Automatic rain barrel 130 may be used to provide water to sprinkler system 140. Pump 150 may be used to pump the water from a tank of the automatic rain barrel 130 to the sprinkler system.

Pump 150 may have a pressure shut-off switch to prevent running dry.

Figure 2:
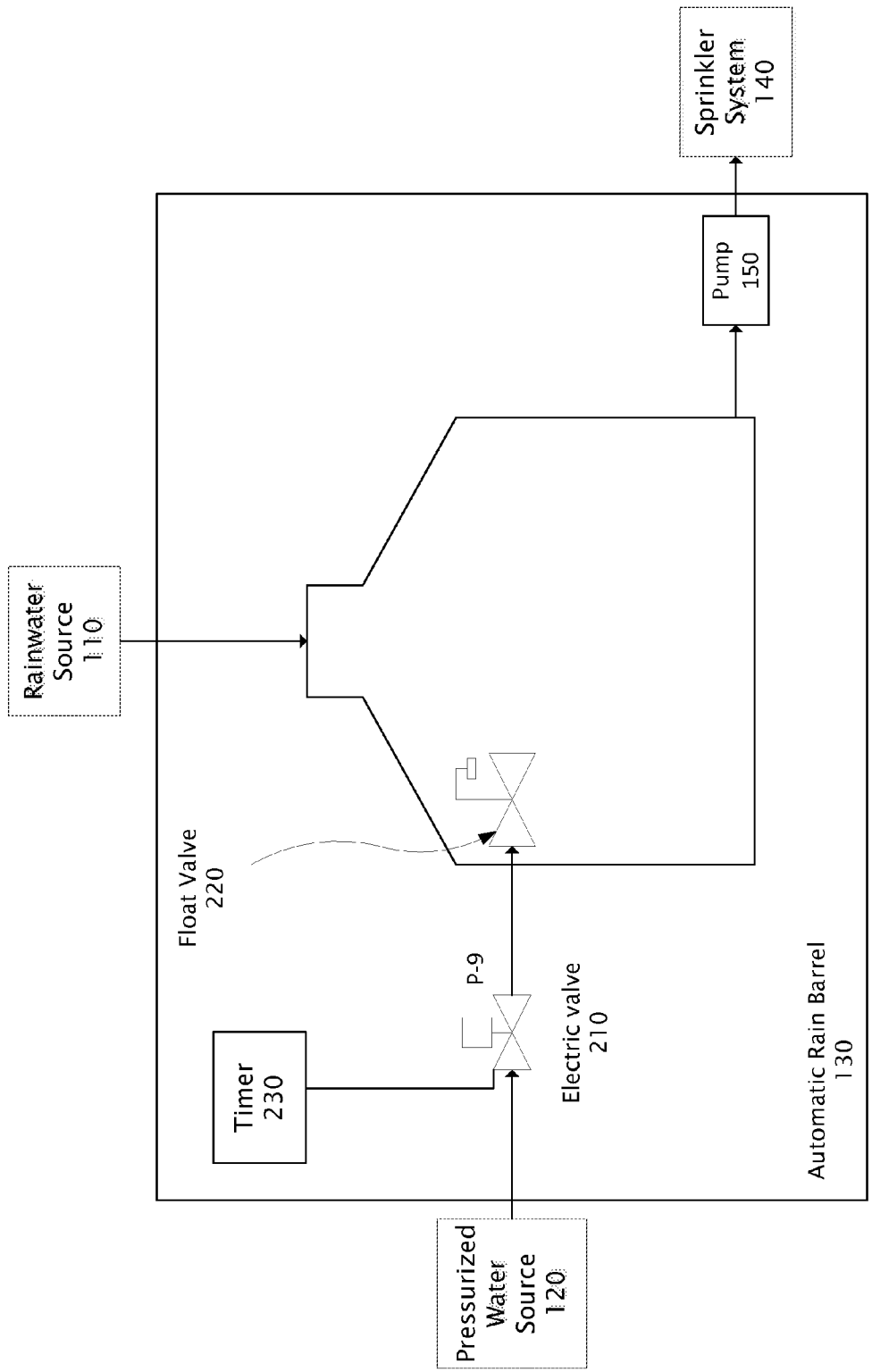
FIG. 2 illustrates one possible implementation of an automatic rain barrel.

FIG. 2 illustrates one possible implementation of an automatic rain barrel. In this implementation, rainwater source 110 may provide available rainwater to Automatic Rain Barrel 130. At a predetermined time, a timer 230 may activate an electric valve 210, allowing water from pressurized water source 120 to enter the tank until float valve 220 reaches a predetermined level. This may ensure sufficient water to supply sprinkler system 140 via pump 150 for a water sprinkling task.

In one implementation, a one thousand gallon capacity tank may be used to collect rainfall from a downspout from a roof. A pressurized water input from a municipal water supply may also be attached to the tank. If six hundred gallons of water are required to provide sufficient sprinkling for a lawn and the tank is full of rainwater, there is no need to add water from the municipal water supply. However, if the tank is half full, an extra one hundred gallons may be required to provide enough water to water the lawn. An electric valve may be set to operate via a timer, so that shortly before the sprinkler operation is to start, the valve will open to allow the pressurized water in. A float valve may then turn off the pressurized water when the tank contains six hundred gallons. This optimizes the use of the collected rainwater while providing a system that a homeowner may rely on to consistently water the lawn with the proper amount of water.

In another implementation, the weight of the tank could be used to determine the amount of water contained in it, and activate a switch to open and close the electric valve as appropriate. In another implementation, the rainwater may be collected from runoff from a driveway. In yet another implementation, a tank may be an open tank catching rain directly. Other implementations may have multiple sources of rainwater feeding a tank. In yet another implementation, a source of water for the tank may be grey water; household wastewater (as from a sink or bath) that does not contain serious contaminants (as from toilets or diapers). In another implementation the tank water may be used to flush a toilet.

In another implementation, multiple tanks may be used to collect water. Tanks may be adjacent to each other or spread out in several areas, such as various corners of a house.

While the detailed description above has been expressed in terms of specific examples, those skilled in the art will appreciate that many other configurations could be used. Accordingly, it will be appreciated that various equivalent modifications of the above-described embodiments may be made without departing from the spirit and scope of the invention.

Additionally, the illustrated operations in the description show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel.

The foregoing description of various embodiments of the invention has been presented for the purposes of illustration and description. It is not intended to be exhaustive or to limit the invention to the precise form disclosed. It is intended that the scope of the invention be limited not by this detailed description, but rather by the claims appended hereto. The above specification, examples and data provide a complete description of the manufacture and use of the invention. Since many embodiments of the invention can be made without departing from the spirit and scope of the invention, the invention resides in the claims hereinafter appended.

The invention claimed is:

1. A rainwater collection system comprising:
   a first tank;
   a first rainwater input to the first tank;
   a pressurized water input to the first tank;
   an electric valve to control a flow of water from the pressurized water input to the first tank;
   a timer electrically connected to the electric valve, the timer configured to open the electric valve at a predetermined time; and
   a valve to limit the flow of water from the pressurized water input when a predetermined quantity of water has been reached in the tank.

2. The rainwater collection system of claim 1, wherein the pressurized water input is attached to a municipal water supply.

3. The rainwater collection system of claim 1, wherein the pressurized water input is attached to a well supply.

4. The rainwater collection system of claim 1 wherein the first rainwater input provides rainwater from runoff from a roof.

5. The rainwater collection system of claim 1 wherein the first rainwater input provides rainwater from runoff from a driveway.

6. The rainwater collection system of claim 1 further comprising a pump configured to pump water from the first tank to a sink for the water.

7. The rainwater collection system of claim 6 wherein the sink for the water is a sprinkler system.

8. An automatic rain barrel comprising:
   a first tank;
   a first rainwater input to the first tank;
   a pressurized water input to the first tank;
   an electric valve to control a flow of water from the pressurized water input to the first tank;
   a timer electrically connected to the electric valve;
   a weight sensor electrically connected to the electric valve, configured to allow the valve to open if the weight sensor senses a weight below a certain level when the timer would open the electric valve; and
   a valve to limit the flow of water from the pressurized water input when a predetermined quantity of water has been reached in the tank.

9. The automatic rain barrel of claim 8 wherein the valve to limit the flow of water from the pressurized water input is a float valve.

* * * * *